United States Patent
Wenink et al.

(10) Patent No.: US 8,260,215 B2
(45) Date of Patent: Sep. 4, 2012

(54) EFFICIENT RECEIVER FREQUENCY PLAN FOR COVERING MULTIPLE FREQUENCY BANDS

(75) Inventors: Brian C. Wenink, Rochester, NY (US); Timothy J. Giles, Brockport, NY (US)

(73) Assignee: Harris Corporation, Melbourne, FL (US)

( * ) Notice: Subject to any disclaimer, the term of this patent is extended or adjusted under 35 U.S.C. 154(b) by 511 days.

(21) Appl. No.: 12/550,833

(22) Filed: Aug. 31, 2009

(65) Prior Publication Data
US 2011/0053544 A1 Mar. 3, 2011

(51) Int. Cl.
*H04B 1/40* (2006.01)

(52) U.S. Cl. ....... 455/87; 455/404.1; 455/323; 455/524; 455/63.1; 455/165.1; 331/179; 327/157; 342/457; 342/450; 375/350

(58) Field of Classification Search ............... 455/404.1, 455/403, 323, 63.1, 79, 165.1, 456.1, 524, 455/166.2; 331/179; 327/157; 342/457, 342/450; 375/350

See application file for complete search history.

(56) References Cited

U.S. PATENT DOCUMENTS

| | | | |
|---|---|---|---|
| 4,310,923 A * | 1/1982 | Kennedy | 455/79 |
| 4,455,679 A * | 6/1984 | Fathauer et al. | 455/165.1 |
| 4,700,375 A | 10/1987 | Reed | |
| 5,548,839 A | 8/1996 | Caldwell et al. | |
| 6,016,422 A | 1/2000 | Bartusiak | |
| 6,028,850 A | 2/2000 | Kang | |
| 6,134,452 A | 10/2000 | Hufford et al. | |
| 6,204,812 B1 * | 3/2001 | Fattouche | 342/457 |
| 6,208,297 B1 * | 3/2001 | Fattouche et al. | 342/450 |
| 6,256,511 B1 | 7/2001 | Brown et al. | |
| 6,266,014 B1 * | 7/2001 | Fattouche et al. | 342/450 |
| 6,330,452 B1 * | 12/2001 | Fattouche et al. | 455/456.1 |
| 6,484,014 B1 | 11/2002 | Koszarsky | |
| 6,574,462 B1 | 6/2003 | Strange | |
| 7,483,687 B2 | 1/2009 | Carrez | |
| 2005/0170808 A1 * | 8/2005 | Hamilton | 455/404.1 |
| 2006/0068746 A1 | 3/2006 | Feng et al. | |
| 2007/0120616 A1 * | 5/2007 | Gonzalez | 331/179 |
| 2007/0264959 A1 * | 11/2007 | Carrez | 455/323 |
| 2008/0139123 A1 * | 6/2008 | Lee et al. | 455/63.1 |
| 2008/0290917 A1 * | 11/2008 | Gonzalez | 327/157 |

\* cited by examiner

*Primary Examiner* — April G Gonzales
(74) *Attorney, Agent, or Firm* — Fox Rothschild, LLP; Robert J. Sacco

(57) ABSTRACT

A communications system includes a radio frequency (RF) element (104) for transforming an input RF signal into at least one of a first conditioned RF input signal associated with a first frequency range and a second conditioned RF input signal associated with a second frequency range higher than the first frequency range. The system also includes a local oscillator (LO) circuit (106) for generating at least a first LO signal, the LO circuit having an operating frequency range spanning at least a portion of a first inclusive frequency range defined by a lowest frequency of the first frequency range and a highest frequency of the second frequency range. The system further includes a mixer (108) for generating a first intermediate frequency (IF) signal based on one of the first and the second RF input signals and the first LO signal, and an IF element (110) for conditioning the first IF signal.

17 Claims, 4 Drawing Sheets

100

300

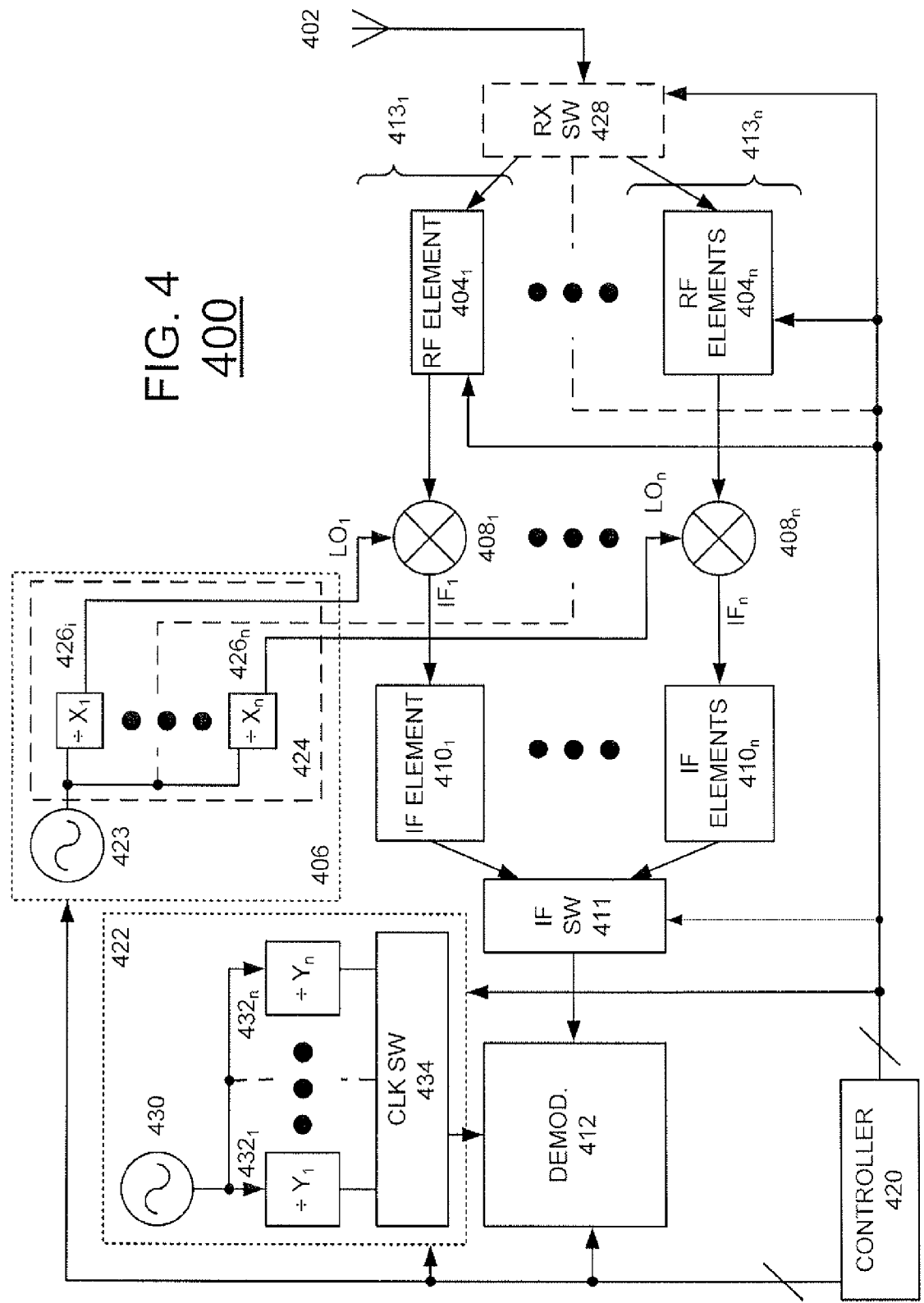

EFFICIENT RECEIVER FREQUENCY PLAN FOR COVERING MULTIPLE FREQUENCY BANDS

FIELD OF THE INVENTION

The present invention relates to communications systems, and more specifically to efficient receiver frequency plans for covering multiple frequency bands in communications systems.

BACKGROUND

In Superheterodyne (superhet) radio frequency (RF) receivers, an advantageous IF (intermediate frequency) is typically chosen to enable removal of spurious products that would interfere with the desired receive frequency. The remainder of the functions performed by the receiver elements, such as preselector filtering, local oscillator, demodulation, and analog to digital conversion process (in the case of digital demodulation), can then be tailored to work in conjunction with the IF of choice. However, in a multiband radio with wide frequency coverage, receiver spurious response rejection performance, local oscillator (LO) tuning range, and/or other design factors are less optimal if a single IF is used for multiple frequency bands.

A common approach in multiband devices to address such issues is the use of multiple superhet receivers in parallel, each designed for a single frequency band. However, this generally results in duplication of components, which increases the cost, weight, and size of the design. Furthermore, additional functionality may be required to coordinate the operation of multiple parallel superhet receivers. Another common approach is the use of double conversion receivers, in which a serial chain of mixers is used to convert RF signals in multiple bands. However, this configuration typically requires local oscillator(s) and mixer that necessarily operate over a tuning range that covers a span of frequencies as wide as the total span of the multiband receiver. For example, for a receiver to cover a span of frequencies of 100-1000 MHz and mix up to an IF of 1200 MHz using high side injection, the LO would need to be able to tune to a range of 1300-2200 MHz, a frequency span of 900 MHz. The associated compromises with such designs can be undesirable in multiband receivers when the frequency coverage is large.

A third approach is the use of direct conversion or zero IF receivers. In this approach, incoming signals are down converted by mixing with a local oscillator signal synchronized in frequency to signal of interest. The desired signal is thus obtained immediately by low-pass filtering the mixer output, without requiring further conversion. Such receivers have been difficult to implement due to inherent complexities in this approach.

In still other approaches, a combination of two or more of the approaches described above have been proposed. However, alone or in combination, these approaches typically negatively impact the costs, complexity, weight, and/or size in multiband communications devices, such as portable radio devices, versus devices designed for operation in a single band.

SUMMARY

Embodiments of the invention provide efficient receiver frequency plans for covering multiple frequency bands in communications systems. In a first embodiment of the invention, a communications system is provided. The system includes a radio frequency (RF) element for transforming an input RF signal into at least one of a first conditioned RF input signal associated with a first frequency range and a second conditioned RF input signal associated with a second frequency range higher than the first frequency range. The system also includes a local oscillator (LO) circuit for generating an LO signal, the LO circuit having an operating frequency range spanning at least a portion of a first inclusive frequency range defined by a lowest frequency of the first frequency range and a highest frequency of the second frequency range. The system further includes a first mixer for generating a intermediate frequency (IF) signal based on one of the first and the second RF input signals and the LO signal. The system also includes a first IF element for conditioning the first IF signal.

In a second embodiment of the invention, a communications system is provided. The system includes a plurality of radio frequency (RF) elements for transforming an input RF signal into one or more conditioned RF input signals, each of the conditioned RF input signals associated with one of a plurality of frequency ranges. The system also includes a local oscillator (LO) circuit for generating a plurality of LO signals, at least one of the plurality of LO signals spanning a frequency range defined by at least a portion of an inclusive frequency range defined by a lowest frequency of the one of the plurality of frequency ranges and a highest frequency of an adjacent higher one of the plurality of second frequency ranges. The system further includes a plurality of mixers associated with each of the plurality of RF elements, the plurality of mixers generating a plurality of intermediate frequency (IF) signals based on corresponding ones of the plurality of LO signals and the plurality of conditioned RF input signals. The system additionally includes a plurality of IF elements associated with each of the mixers for conditioning corresponding ones of the plurality of IF signals.

In a third embodiment of the invention, a land mobile radio (LMR) system is provided. The system includes a first radio frequency (RF) element for transforming an input RF signal into at least one of a first conditioned RF input signal associated with a first public safety radio communications band frequency range (first range) and a second conditioned RF input signal associated with a second public radio communications band frequency range (second range) higher than the first range. The system also includes a second radio frequency (RF) element for transforming the input RF signal into at least one of a third conditioned RF input signal associated with a third public safety radio communications band frequency range (third range) lower than the first range and a fourth conditioned RF input signal associated with a fourth public safety radio communications band frequency range (fourth range) between the first range and the third range. The system further includes a tunable oscillator for generating a first LO signal, the first LO signal spanning a first inclusive frequency range defined by at least a portion of a frequency range defined by a lowest frequency of the first range and a highest frequency of the second range. The system additionally includes a frequency divider circuit coupled to the tunable oscillator for generating a second LO signal including a frequency divided version of the first LO signal, where a frequency division ratio is selected to provide a second inclusive frequency range for the third and the fourth ranges. The system also includes a first intermediate frequency (IF) conversion stage for generating a first conditioned IF signal based on one of the first and the second conditioned RF input signals and the first LO signal; and a second intermediate frequency (IF) conversion stage for generating a second conditioned IF signal based on one of the third and the fourth conditioned RF input signals and the second LO signal.

BRIEF DESCRIPTION OF THE DRAWINGS

FIG. 4 is a third receiver system, according to yet another embodiment of the invention.

DETAILED DESCRIPTION

Figure 1:
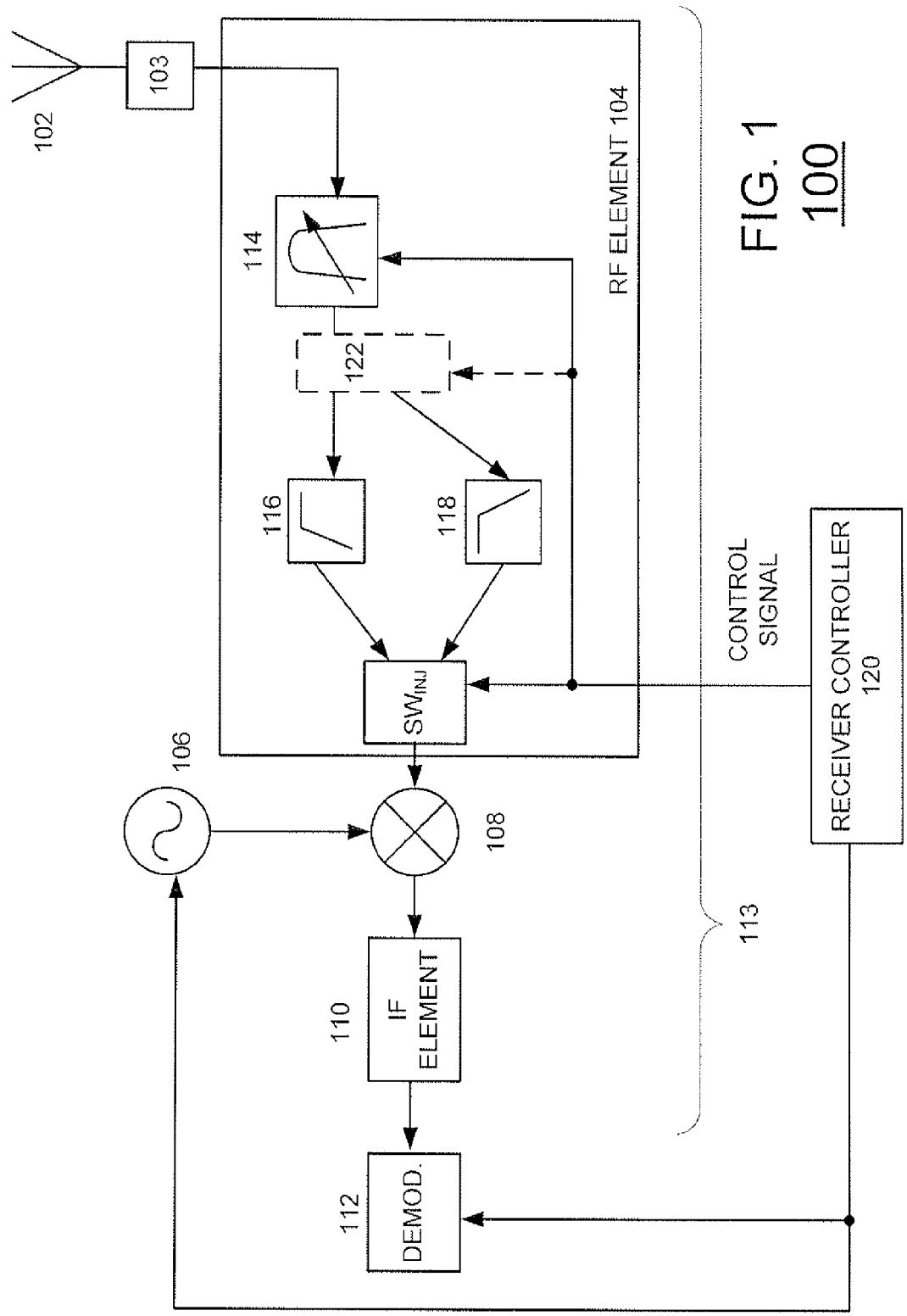
FIG. 1 is a first receiver system, according to an embodiment of the invention.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

As described above, one of the limitations of parallel superhet receiver design is that for each frequency band of interest, the various components in the superhet receiver path typically need to be duplicated. For example, each receiver path typically requires a separate local oscillator (LO) circuit generating the LO signals, a separate mixer to generate intermediate frequency (IF) signals, and a separate demodulator to extract the data from the input radio frequency (RF). When designing such a receiver, each of the superhet receivers is generally configured to use high side or low side injection. In a superhet receiver design using high side injection, the LO signal operates in a frequency range ("LO range") higher than the RF band of interest, and the RF signal requires filtering to remove the mixer image frequencies that occur at frequencies above the LO range. In a superhet receiver design using low side injection, LO range is lower than the RF band of interest, and the RF signal requires filtering to remove the mixer image frequencies that occur at frequencies below the LO range. These RF filters for removal of image frequencies are in addition to the LO circuit, mixer, demodulator, and any analog to digital converters, filters, and/or amplifiers typically included for each parallel superhet receiver. Therefore, as the number of frequency bands increases, the number of components can increase significantly.

Although use of a single LO for multiple bands is theoretically possible, a superhet receiver typically generates an unwanted image product that occurs at half the frequency of the IF signal away from the frequency of the RF signal. For example, if an IF of 20 MHz is used, an 800 MHz RF signal will generally have to be able to filter out an interfering signal that is only 10 MHz away. As a result, a higher IF is typically used to reduce the complexity of the required filter. However, increasing the IF while using one LO to cover adjacent frequency bands will generally require an increase the required tuning range of the LO.

To overcome the limitations of conventional superhet receivers, embodiments of the invention provide more efficient receiver designs that reduce the number of components typically required for a multiband parallel superhet receiver design. One aspect of the invention provides for using a combination of low and high side injection superhet receiver paths to eliminate the number of LO signals and the number RF-to-IF conversion stages needed for demodulation of two or more RF input signals. In particular, a single RF-to-IF conversion stage, including the RF to IF mixer, is configured to receive RF signals for two frequency band or ranges. Additionally, rather than providing a local oscillator for each frequency band, a single LO signal, spanning an inclusive frequency range with respect to the two frequency bands is used at the mixer. An "inclusive frequency range", as used herein, refers to a frequency range that spans at least a portion of a frequency range defined by a lowest frequency in the lowest of the two frequency bands and a highest frequency in the highest of the two frequency bands. By careful selection and control of the inclusive frequency range and the image rejection filters, a single RF-to-IF conversion stage can be used to generate a single IF signal for both frequency bands. In particular, the RF-to-IF conversion stage and the single LO signal can be operated in a high side injection mode and a low side injection mode to allow demodulation of RF signals in two frequency bands.

In the various embodiments of the invention, a single RF-to-IF conversion stage is selectably coupled to at least two filter paths. A first low side injection path, including a low pass filter, for providing input RF signals in a frequency band higher than the LO signal operating frequencies. A second path can be a high side injection path, including a high pass filter, for providing RF signals in a frequency band lower than the LO signal operating frequencies. Accordingly, the single RF-to-IF conversion stage can generate IF signals for the selected injection path without excessive duplication of components. An exemplary receiver illustrating this concept is shown in FIG. 1.

FIG. 1 shows a first receiver system 100 according to an embodiment of the invention. As shown in FIG. 1, the system 100 includes an antenna 102 for receiving an input RF signal, an RF element 104 for conditioning the input RF signal, and a local oscillator (LO) 106 for generating an LO signal. The system 100 also includes a mixer 108 for combining the conditioned RF signal with the LO signal to produce an intermediate frequency (IF) signal. The system 100 further includes an IF element 110 for conditioning the IF signal from the mixer 108 and a demodulator 112 for demodulating the conditioned IF signal. Together, the RF element 104, the mixer 108, and the IF element 110 define a receiver path 113.

The RF element 104 includes two RF signal conditioning paths. In particular, the signal conditioning paths can include a high side injection path and a low side injection path for creating low and high pass filtered/conditioned RF signals. The high side injection path is formed by preselector 114 and high pass filter 116. The low side injection path is formed by preselector 114 and low pass filter 118. The conditioned RF signal to be combined at mixer 108 can be selected using a switch ($SW_{INJ}$) based on one or more control signals from a receiver controller 120. The controller 120 can also generate control signals for the demodulator 112 and the LO 106 corresponding to the selected injection path.

In the some embodiments of the invention, the preselector 114 can comprise one or more band pass filter elements tuned to the frequency band of interest. The preselector 114 can also include one or more amplification elements. The amount and frequency range of amplification or filtering in preselector 114 can be pre-defined or can be adjusted based on one or more control signals from controller 120, as shown in FIG. 1. However, in some embodiments, RF element 104 can be configured to exclude preselector 114. That is, the RF input signal is only filtered using filters 116 and 118.

In operation, an input RF signal is received by antenna 102 and directed to preselector 114 in RF element 104. In some embodiments, one or more other RF components 103, such as amplification, filtering, or coupling elements, can be used to couple antenna 102 and RF element 104. The preselector 114 performs amplification and/or filtering of the input RF signal. As described above, the amount and range of filtering and/or amplification can be based on control signals received from controller 120. The preselector 114 can be configured to operate in a frequency range ($f_1$-$f_4$) spanning the two frequency bands or ranges of interest (e.g., $f_1$-$f_2$, $f_3$-$f_4$, where $f_2 \leq f_3$). Once the RF input signal is initially conditioned by the preselector 114, the RF signal can be provided to both the high pass 116 and low pass 118 filters to remove low or high image frequencies, respectively, depending on the frequency range of interest. In some embodiments, an additional switch 122 can also be provided to direct the RF input signal to only one of filters 116 and 118. The operation of switch 122 can also be based on the control signals for switch $SW_{INJ}$ to provide concerted action between the two switches.

In the system 100, LO 106 can be a tunable oscillator (TO), such as electronic oscillator circuit that produces a repetitive electronic signal based on a voltage or current. For example, the TO can generate a sine wave or a square wave having a tunable frequency. In the various embodiments of the invention, an LO is configured to operate in an inclusive frequency range with respect to two frequency bands or ranges of interest, where the range is selected to provide a desired IF for input RF signals in both frequency bands of interest. That is, since a mixer typically provides an IF by generating a difference between the LO signal and the conditioned RF input signal, the range of the LO 106 can be selected such that the difference resulting from a high or a low frequency band signal is the same.

The configuration in FIG. 1 allows the single LO 106 to be used in both in a high side injection mode and in a low side injection mode, depending on the operation of $SW_{INJ}$ (and switch 122, if present). Thus, a high side injection superhet receiver is formed when filter 116 is selected using switch $SW_{INJ}$ (and switch 122). As a result, any low frequency signals are filtered out, including any image frequencies and any other signals in frequency bands lower than the LO range. The conditioned input RF signal from filter 116 can then be combined with the LO signal at mixer 108 and the resulting IF signal represents only the RF signals in the higher frequency band ($f_3$-$f_4$). A low side injection superhet receiver is formed when filter 118 is selected using switch $SW_{INJ}$ (and switch 122, if present). As a result, any high frequency signals are filtered out, including any image frequencies and any signals frequency bands higher than the LO range. The conditioned input RF signal from filter 118 can then be combined with the LO signal at mixer 108, resulting in an IF signal that represents only the RF signals in the lower frequency band ($f_1$-$f_2$).

Figure 2:
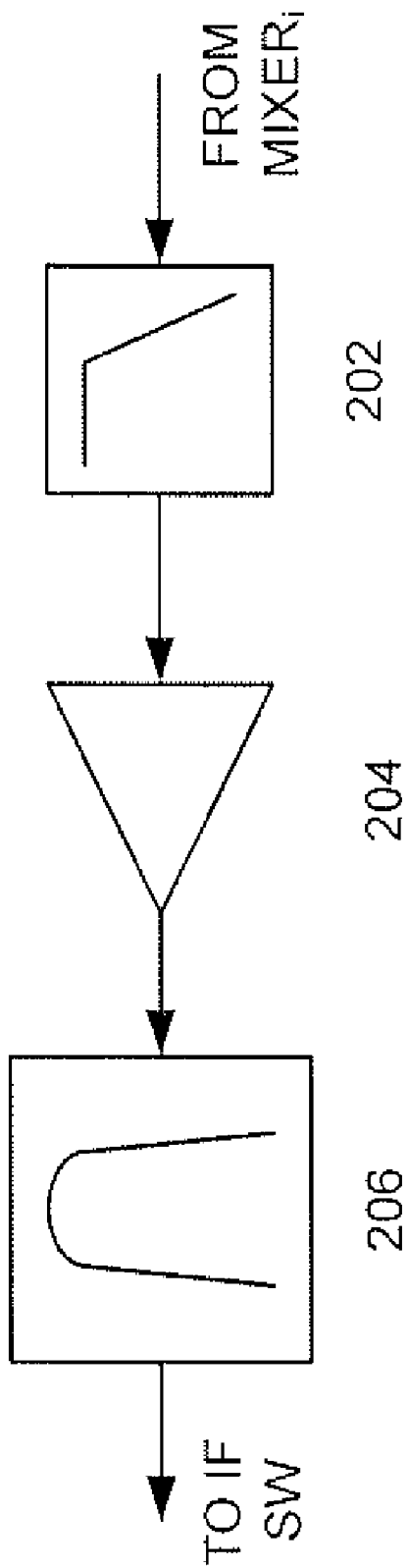
FIG. 2 is exemplary configuration for the IF element in FIG. 1.

Once the IF signal is generated at mixer 108, the IF signal can be conditioned by IF element 110 and demodulated at demodulator 112. In some embodiments the IF element 110 can include one or more filtering and/or amplification stages, as in conventional superhet receivers. An exemplary configuration for IF element 110 is shown in FIG. 2. For example, as shown in FIG. 2, IF element 110 can include at least one filter (IF filter 202) to filter the output of a mixer (such as mixer 108). In general, a mixer has imperfect isolation between its input ports and its output ports. Accordingly, LO and RF signals can "leak" to the output port. As a result, the output of the mixer may include frequency components associated with the RF and LO signals. Filter 202 can be provided to remove such frequency components. In the case of IF signals in a frequency range lower than the RF signals and the LO range, as in the various embodiments of the invention, a low pass filter, as shown in FIG. 2, can be provided to remove these so-called "leakage" signals.

Although shown as a low pass filter in FIG. 2, in other embodiments, IF filter 202 can be a band pass filter. Additionally, an amplifier 204 can also be used to amplify the IF signal. In some embodiments, an additional bandpass filter 206 can also be used to remove all signals, except those in the channel of interest, prior to demodulation in demodulator 112. The IF element shown in FIG. 2 is presented by way of example and not limitation. In some embodiments, filters 202 and 206 and amplifier 204 can be implemented as a single component. In other embodiments of the invention, each of filters 202 and 206 and amplifier 204 can be implemented using one or more components.

The various embodiments of the invention are not limited to the single preselector configuration, as shown in FIG. 1. In other embodiments, the frequency bands of interest may be separated to such an extent that a single preselector cannot provide adequate filtering and/or amplification of the frequency bands of interest. Accordingly, separate preselectors are used for each band. However, by selecting an appropriate inclusive frequency range, a single IF can still be generated for the two frequency bands, alleviating the need for excessive duplication of components. This is illustrated in FIG. 3.

Figure 3:
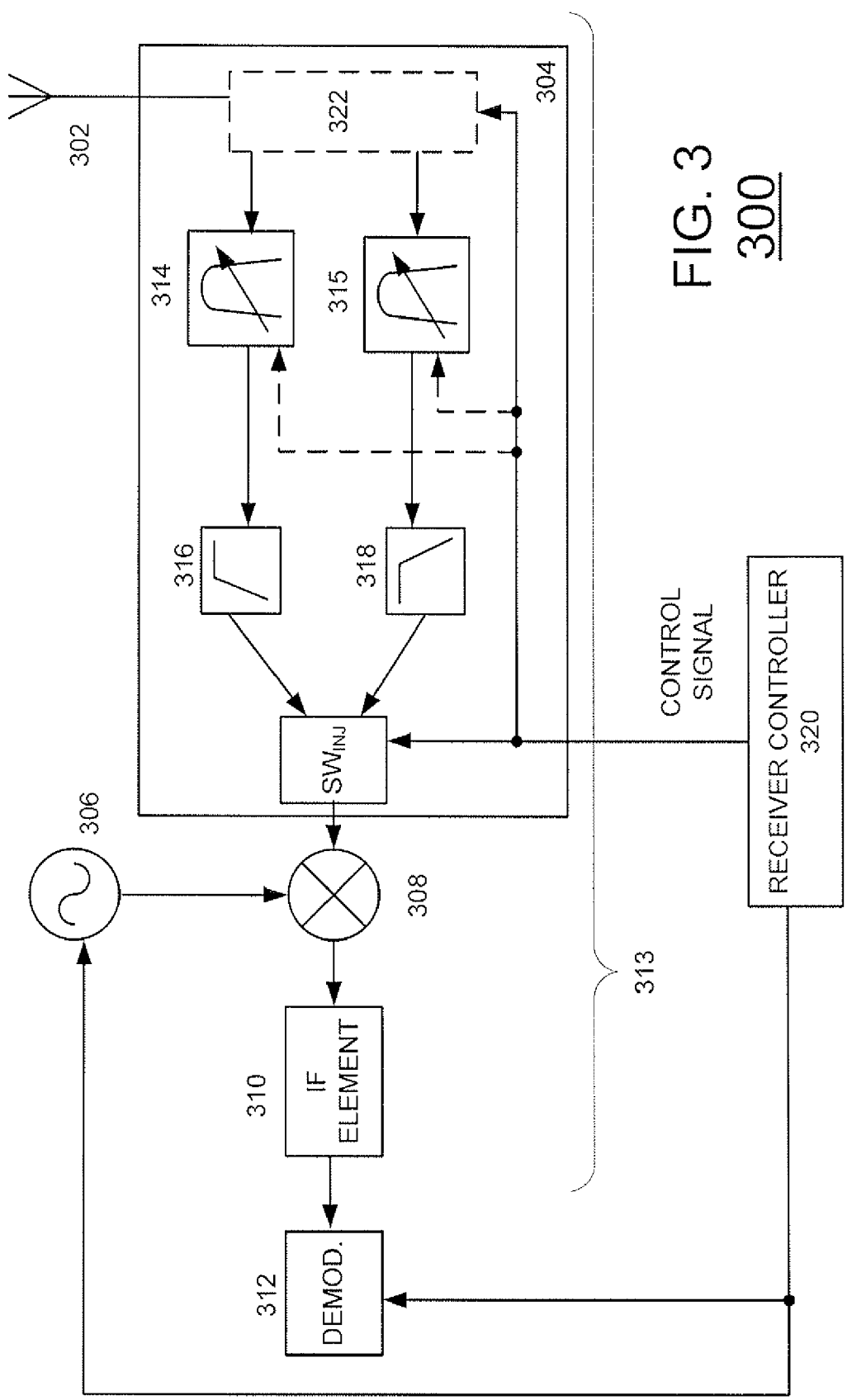
FIG. 3 is a second receiver system, according to another embodiment of the invention.

FIG. 3 shows a second receiver system 300 according to an embodiment of the invention. Similar to the system in FIG. 1, the system 300 in FIG. 3 includes an antenna 302 for receiving an input RF signal, an RF element 304 for conditioning the input RF signal, and a local oscillator (LO) 306 for generating an LO signal. The system 300 also includes a mixer 308 for combining the conditioned RF signal with the LO signal to produce an intermediate frequency (IF) signal. The system 300 further includes an IF element 310 for conditioning the IF signal from the mixer 308 and a demodulator 312 for demodulating the conditioned IF signal. Together, RF element 304, mixer 308, and IF element 110 define a receiver path 313. The operation of components 302, 306, 308, 310, 312 and 320, is similar to that described above for corresponding components in FIG. 1 and the description provided above is sufficient to describe operation of these components in FIG. 3.

The RF element 304 also includes two RF signal conditioning paths, albeit with different preselectors. In system 300, the high side injection path is formed by first preselector 314 and high pass filter 316. The low side injection path is formed by preselector 315 and low pass filter 318. The conditioned RF signal to be combined at mixer 308 can be selected using a switch ($SW_{INJ}$) based on one or more control signals from the receiver controller 320.

In FIG. 3, the preselectors 314, 315 can comprise band pass filters tuned to the frequency bands of interest and can also include one or more amplification elements. The amount and frequency range of amplification or filtering can be pre-defined or can be adjusted based on one or more control signals from controller 320.

In operation, an input RF signal is received by antenna 302 and directed to preselectors 314, 315 in RF element 104. The preselectors 314, 315 performs amplification and/or filtering of the input RF signal. As described above, the amount and range of filtering and/or amplification can be based on control signals received from controller 320. The preselector 314 can be configured to operate in a first frequency range ($f_3$-$f_4$) associated with a higher frequency band. The preselector 315 can be configured to operate in a second frequency range ($f_1$-$f_2$) associated with a lower frequency band. Once the RF input signal is initially conditioned by the preselectors 314, 315, the RF signals can be provided to respective the high pass 316 and low pass 318 filters to remove image frequencies for each band. In some embodiments, an additional switch 322 can also be provided to direct the RF input signal to only one of preselectors 314, 315. The operation of switch 322 can also be based on the control signals for switch $SW_{INJ}$ to provide concerted action between the two switches.

In the system 300, LO 306 is configured to operate in an inclusive frequency range with respect to two frequency bands or ranges of interest. As previously described with respect to FIG. 1, the range of the LO 306 can be selected such that the resulting IF signal has the same frequency. For example, if low frequency range is 380-520 MHz and a high frequency range is 762-870 MHz, an LO operating in a frequency range of ~536-714 MHz can be selected and used with a mixer to provide an IF of ~156 MHz for both bands. That is, low frequency range signals are mixed to an IF of ~156 MHz (536–380=676–520=156) and the high frequency range signals are mixed to a same IF of ~156 MHz (870–714=762–606=156). Signals from controller 320 would be selected to control the LO signal being generated at LO 306 to provide the appropriate range of frequencies for high and low side mixer injection.

Although the exemplary receivers in FIGS. 1 and 3 include a single receiver path and are associated with only two frequency bands of interest, the various embodiments of the invention are not limited in this regard. In some embodiments of the invention, any number or combination of receiver paths can be used to provide an efficient receiver design. However, the number of local oscillators needed for a multiple frequency band device can be reduced via the use of frequency dividers. That is, at least one additional LO signal can be generated by using a frequency divider to generate a lower frequency version of the original LO signal. In such embodiments of the invention, the frequency divider can be selected so as to generate an additional inclusive frequency range for one or more receiver paths. Although such a configuration can result in additional IF signals being generated at additional frequencies, the use of a single LO still provides a reduced number of components as compared to conventional parallel superhet receiver arrangements. This is conceptually illustrated with respect to FIG. 4.

FIG. 4 shows another receiver system 400 according to an embodiment of the invention. As shown in FIG. 4, the system 400 includes an antenna 402 for receiving an input RF signal and a plurality of receiver paths $413_1$ . . . $413_n$ (collectively 413) for generating a plurality of IF signals.

The receiver paths 413 each include RF elements $404_1$ . . . $404_n$ (collectively 404) for conditioning the input RF signal and mixers $408_i$ . . . $408_n$ (collectively 408) associated with each of RF elements 404. The mixers 408 combine the conditioned RF signal from a corresponding one of RF elements 404 with a corresponding LO signal to produce IF signals $IF_1$ . . . $IF_n$. Each of the receiver paths 412 further includes IF elements $410_1$ . . . $410_n$ (collectively 410) for conditioning the IF signals from corresponding ones of mixers 108. The system 400 also includes a demodulator 412 for demodulating one of the conditioned IF signals, where the IF signal is selected using an IF switch 411.

Each of the RF elements 404 can include one or more RF signal conditioning paths, as described above with respect to RF element 104 and RF element 304 in FIGS. 1 and 3, respectively. In particular, the RF elements 404 can include a high side injection path and/or a low side injection path for creating low and/or high pass filtered/conditioned RF signals, as previously described with respect to FIGS. 1 and 3. In some embodiments, the input RF signal can be provided to only one of RF elements 404 using a receive switch 428 based on one or more control signals from a receiver controller 420. In some embodiments, the controller 420 can be configured to enable/disable portions of the system 400 that are not related to the current frequency of interest. For example, one or more of the RF elements 404, mixers 408, and IF elements 410 can be disable when not in use. Additionally, such a configuration reduces the likelihood of interference between the different receiver paths in system 400.

In system 400, an LO circuit 406 is used to generate LO signals $LO_1$ . . . $LO_n$ for each of RF elements 404. In the various embodiments of the invention, this is accomplished by directing the output of a TO 423 into frequency divider circuit 424. As shown in FIG. 4, circuit 424 can comprise frequency divider paths $426_1$ . . . $426_n$ providing parallel frequency divider elements for frequency dividing the oscillator signal from TO 423 according to their respective frequency division ratios ($X_1$ . . . $X_n$). A "frequency divider element", as used herein, refers to any type of electronic circuit that takes a signal having a first frequency and generates a signal having a second frequency equal to the first frequency divided by the a pre-defined division ratio. However, FIG. 4 illustrates only one exemplary embodiment for divider circuit 424. In other embodiments of the invention, the paths $426_1$ . . . $425_n$ can be based on a serial and/or cascaded arrangement of frequency divider elements separated by switches, such that a selection of switches (via control signals from controller 420) selects a path of frequency divider elements which cumulatively provide a frequency ratio for the signal from TO 423. In some embodiments of the invention, a combination of frequency divider elements in parallel, in series, and/or cascaded can be used for defining paths $426_1$ . . . $426_n$. To minimize the number of active components, the frequency divider circuit can also be configured to provide a single LO signal to all mixer 108 in concert with the operation of IF switch 411.

In operation, an input RF signal is received by antenna 402 and directed to RF elements 404. In some embodiments, a receive switch 428, controlled by controller 420 in concert with switch 411, can be provided to select one of receiver paths 413. Each of the RF elements 404 can then perform amplification and/or filtering of the input RF signal, as described above with respect to FIGS. 1 and 3, and the amount and range of filtering and/or amplification can be based on control signals received from controller 420.

For RF elements associated with two frequency bands or ranges of interest, the LO circuit is configured to generate LO signals in an inclusive frequency range. By careful selection of the division ratios for each of frequency divider paths $426_1$ . . . $426_n$, each receiver path in system 400, defined by corresponding ones of RF elements 404, mixers 408, and IF elements 410, can be used in both in a high side injection mode and in a low side injection mode, as described above with respect to FIGS. 1 and 3.

The conditioned RF input signals received by the mixers 108 can then be combined with respective ones of LO signals $LO_1$ . . . $LO_n$ to generate corresponding IF signals $IF_1$ . . . $IF_n$.

The IF signals can then be conditioned by one of corresponding IF elements 410, as described above with respect to FIG. 2. The conditioned IF signal of interest can then be selected by IF switch 411 and the selected conditioned IF signal is demodulated using demodulator 412.

As described above, generating multiple LO signals can result in the generation of multiple IF frequencies. To support demodulation of the different IF signals, demodulator 412 can receive a varying clock signal from clock 422 to generate a second same IF signal for all conditioned IF signals. Such a configuration reduces the complexity of demodulator 412. Clock 422 can include a TO 430, divider circuits $432_1 \ldots 432_n$, and a switch 434. In operation, clock 422 generates a clock signal for demodulator 412 in a similar fashion as LO circuit 406. That is, the signal from TO 430 is frequency divided using one of divider circuits $432_1 \ldots 432_n$, each associated with a frequency division ratio $Y_1 \ldots Y_n$. The controller 420 can then select the corresponding clock signal for the IF signal selected at switch 411. For example, if system 400 comprises two receiver paths operating at ~21 MHz and 154 MHz, clock 422 can be configured to generate clock signals at 19 and 152 MHz, respectively. As a result, the second IF for both paths is ~2 MHz (21−19=154−152=2).

The configuration shown in FIG. 4 is advantageous in the case of a multiband LMR device, as a more efficient receiver design can be provided with a reduced number of components as compared to conventional parallel superhet receiver designs. For example, to support communications in VHF (136-174 MHz), UHF (380-520 MHz), and 700/800 (698-870 MHz) public safety radio communications bands, a design including a single LO and two receiver paths can be provided. To support the UHF and 700/800 public safety bands, a first receiver path, similar to that described in FIG. 3, can be provided. That is, a first of RF elements 404 can be configured as described above for RF element 304 in FIG. 3. The TO 406 and the divider circuit 424 can then be selected to provide LO signals in the range between the two bands, also as described above with respect to FIG. 3. Although the LO signal for the first path can be a frequency divided output, if no higher frequencies are to be supported, the TO 423 can be selected to directly output the necessary range of frequencies for producing IF signals at ~154 MHz, as described above with respect to FIG. 3. For example, $X_1=1$ or divider $426_1$ can be a direct connection to mixer $408_1$.

To support the VHF public safety band, a second receiver path, similar to that described in FIG. 1, can be selected, where the VHF public safety band is divided into low VHF and high VHF public safety bands. However, rather than providing a separate LO circuit for this second path, frequency divider circuit 424 can be configured to generate an output comprising a frequency divided version of the output of TO 423, to provide the inclusive frequency range for the two VHF public safety bands to produce IF signals at ~21 MHz. In particular, by dividing the output of the LO signals for the UHF and 700/800 public safety bands by four, an appropriate intermediate range can be generated.

As a result of the configuration above, the number of components is significantly reduced. For example, the number of TOs is reduced from four to one. Additionally, the number of mixers and the number of IF elements can each be reduced by at least one.

The use of frequency division is not limited solely to LO 406. For example, as shown in FIG. 4, frequency division can also be used to generate signals at clock 422. That is, a single LO 430 can be used to generate multiple clock signals. For example, if LO 430 is configured to generate a signal at 304 MHz, the output can be divided by 2 and 16. This produces clock signals at 19 and 152 MHz which can be provided to generate second IF of 2 MHz for input IF's of 21 and 154 MHz, respectively.

While various exemplary embodiments of the invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A communications device, comprising:
   a first radio frequency (RF) element coupled to an antenna and comprising a low side injection path for transforming an input RF signal received by said communications device into a first conditioned RF input signal limited to a first frequency range and a high side injection path for transforming said input RF to a second conditioned RF input signal limited to a second frequency range higher than said first frequency range;
   at least one injection switch for selecting one of said first and said second conditioned RF input signals;
   a first local oscillator (LO) circuit for generating at least a first LO signal, said first LO circuit having an operating frequency range spanning at least a portion of a first inclusive frequency range defined by a lowest frequency of said first frequency range and a highest frequency of said second frequency range;
   a first mixer coupled to said at least one injection switch for generating a first intermediate frequency (IF) signal based on a selected one of said first and said second conditioned RF input signals communicated to said first mixer by said injection switch, and exclusively said first LO signal; and
   a first IF element for conditioning said first IF signal.

2. The communications system of claim 1, further comprising at least one switch for directing said input RF signal through one of said low and said high side injection paths.

3. The communications system of claim 1, wherein said low side injection path comprises a filter for removing at least portion of said RF input signal comprising frequencies higher than a highest frequency of said first frequency range.

4. The communications system of claim 1, wherein said high side injection path comprises a filter for removing at least portion of said RF input signal comprising frequencies lower than a lowest frequency of said second frequency range.

5. A communications device, comprising:
a first radio frequency (RF) element for transforming an input RF signal into at least one of a first conditioned RF input signal associated with a first frequency range and a second conditioned RF input signal associated with a second frequency range higher than said first frequency range;
a first local oscillator (LO) circuit for generating at least a first LO signal, said first LO circuit having an operating frequency range spanning at least a portion of a first inclusive frequency range defined by a lowest frequency of said first frequency range and a highest frequency of said second frequency range;
a first mixer for generating a first intermediate frequency (IF) signal based on one of said first and said second RF input signals and said first LO signal; and
a first IF element for conditioning said first IF signal
a second radio frequency (RF) element for transforming said input RF signal into at least one of a third conditioned RF input signal associated with a third frequency range lower than said first frequency range and a fourth conditioned RF input signal associated with a fourth frequency range lower than said third frequency range;
a frequency divider circuit for generating at least a second LO signal based on said first LO signal, said second LO signal comprising a frequency divided version of the first LO signal, said second LO signal spanning at least a portion of a second inclusive frequency range defined by a lowest frequency of said fourth frequency range and a highest frequency of said third frequency range;
a second mixer for generating a second intermediate frequency (IF) signal based on one of said third and said fourth conditioned RF input signals and said second LO signal;
a second IF element for conditioning said second IF signal; and
a demodulator for demodulating one of said first and said second IF signals.

6. The communications system of claim 5, further comprising:
a switch for directing one of said first and said second IF signals into said demodulator.

7. A communications system comprising:
a plurality of radio frequency (RF) elements for transforming an input RF signal into one or more conditioned RF input signals associated with a plurality of frequency ranges, at least one of said plurality of RF elements associated with a first of said plurality of frequency ranges and a second of said plurality of frequency ranges higher than said first of said plurality of frequency ranges;
at least a second one of said plurality of RF elements associated with a third of said plurality of frequency ranges lower than said first frequency range and a fourth of said plurality of frequency ranges lower than said third frequency range;
a local oscillator (LO) circuit for generating a plurality of LO signals, at least a first one of said plurality of LO signals spanning a frequency range defined by at least a portion of a first inclusive frequency range defined by a lowest frequency of said first of said plurality of frequency ranges and a highest frequency of said second of said plurality of second frequency ranges;
a frequency divider circuit for generating at least a second LO signal based on said first one of said plurality of LO signals, said second LO signal comprising a frequency divided version of the first LO signal, said second LO signal spanning at least a portion of a second inclusive frequency range defined by a lowest frequency of said fourth frequency range and a highest frequency of said third frequency range;
a first mixer and a second mixer, each associated with a respective one of said plurality of RF elements, said plurality of mixers generating a plurality of intermediate frequency (IF) signals based on corresponding ones of said plurality of LO signals and said plurality of conditioned RF input signals; and
a first IF element and a second IF element, each associated with a respective one of said first and second mixers for conditioning corresponding ones of said plurality of IF signals.

8. The communications system of claim 7, wherein at least one of said plurality of RF elements further comprises a low side injection path for transforming said input RF signal into a first conditioned RF input signal and a high side injection path for generating a second conditioned RF input signal.

9. The communications system of claim 8, wherein said one of said plurality of RF elements further comprises at least one switch for directing said input RF signal through one of said high and said high side injection paths.

10. The communications system of claim 8, wherein said low side injection path comprises a filter for removing at least portion of said RF input signal comprising frequencies higher than a highest frequency of said first of said plurality frequency ranges.

11. The communications system of claim 8, wherein said high side injection path comprises a filter for removing at least portion of said RF input signal comprising frequencies lower than a lowest frequency of said second of said plurality of frequency ranges.

12. The communications system of claim 7, wherein said first of said plurality of frequency ranges comprises a UHF public safety radio communications band frequency range and said second of said plurality of frequency ranges comprises a 700/800 public safety radio communications band frequency range, and wherein said first one of said plurality of LO signals spans a portion of a frequency range between said UHF band frequency range and said 700/800 band frequency range.

13. A land mobile radio (LMR) system, comprising:
a first radio frequency (RF) element for transforming an input RF signal into at least one of a first conditioned RF input signal associated with a first public safety radio communications band frequency range (first range) and a second conditioned RF input signal associated with a second public radio communications band frequency range (second range) higher than said first range;
a second radio frequency (RF) element for transforming said input RF signal into at least one of a third conditioned RF input signal associated with a third public safety radio communications band frequency range (third range) lower than said first range and a fourth conditioned RF input signal associated with a fourth public safety radio communications band frequency range (fourth range) between said first range and said third range;

a tunable oscillator for generating a first LO signal, said first LO signal spanning a first inclusive frequency range defined by at least a portion of a frequency range defined by a lowest frequency of said first range and a highest frequency of said second range;

a frequency divider circuit coupled to said tunable oscillator for generating a second LO signal comprising a frequency divided version of said first LO signal, where a frequency division ratio is selected to provide a second inclusive frequency range for said third and said fourth ranges;

a first intermediate frequency (IF) conversion stage for generating a first conditioned IF signal based on one of said first and said second conditioned RF input signals and said first LO signal; and a second intermediate frequency (IF) conversion stage for generating a second conditioned IF signal based on one of said third and said fourth conditioned RF input signals and said second LO signal.

14. The communications system of claim 13, wherein a frequency division ratio of said frequency divider circuit is 4.

15. The communications system of claim 13, further comprising:

a demodulator for demodulating one of said first and said second conditioned IF signals; and a switch for directing one of said first and said second conditioned IF signals into said demodulator.

16. The communications system of claim 15, wherein each of said first and said second RF elements further comprises a low side injection path and a high side injection path.

17. The communications system of claim 13, wherein said first and said second ranges comprise first and second UHF frequency ranges, and where said third and said fourth ranges comprise first and second VHF frequency ranges.

* * * * *